United States Patent [19]

Fowler

[11] Patent Number: 4,912,684
[45] Date of Patent: Mar. 27, 1990

[54] SEISMIC STREAMER COMMUNICATION SYSTEM

[75] Inventor: John T. Fowler, Marblehead, Mass.

[73] Assignee: Digicourse, Inc., Hanrahan, La.

[21] Appl. No.: 162,069

[22] Filed: Feb. 29, 1988

[51] Int. Cl.⁴ .................................................. G01V 1/22
[52] U.S. Cl. ........................................ 367/76; 367/16
[58] Field of Search .................................. 367/16–20, 367/106, 130, 79, 80, 78, 76; 114/245; 340/310 R

[56] References Cited

U.S. PATENT DOCUMENTS

| | | | |
|---|---|---|---|
| 4,093,946 | 6/1978 | Fowler | 340/310 R |
| 4,375,089 | 2/1983 | Thigpen et al. | 367/20 |
| 4,390,974 | 6/1983 | Siems | 367/76 |
| 4,631,711 | 12/1986 | Fowler | 367/149 |
| 4,709,355 | 11/1987 | Woods et al. | 367/16 |

Primary Examiner—Thomas H. Tarcza
Assistant Examiner—Daniel T. Pihulic
Attorney, Agent, or Firm—Weingarten, Schurgin, Gagnebin & Hayes

[57] ABSTRACT

A communication system for a seismic streamer by which all power and data signals are inductively coupled to the cable leveling devices or instrument pods disposed along the streamer cable. A high permeability ring of magnetic material is dispose around the streamer, and a coil is wound around a segment of the core and connected to circuitry within the bird. The coil can be part of a resonant circuit. Power signals transmitted along the streamer are inductively coupled via the ring core and associated coil to each bird to provide charging of a battery source in the bird. Control signals transmitted along the streamer are coupled via the ring core and coil to the electronics via the ring core and coil to the streamer for transmission to a receiving site. Alternative embodiments are also disclosed in which inductive coupling structures include a portion within the streamer in efficient coupling relationship for power and data transmission.

28 Claims, 3 Drawing Sheets

SEISMIC STREAMER COMMUNICATION SYSTEM

FIELD OF THE INVENTION

This invention relates to seismic streamers, and more particularly to a communication system for providing inductively coupled power and data signals between a streamer a cable and one or more cable leveling or other devices disposed therealong.

BACKGROUND OF THE INVENTION

Seismic streamers are employed in marine exploration, and include a streamer cable towed behind a vessel and having spaced along the length thereof a plurality of cable leveling devices, commonly known as birds, which include controllable vanes by which the bird and cable are maintained at a predetermined depth. Seismic instrumentation usually disposed in pods along the streamer is operative to receive seismic reflections employed in a seismic or geologic survey being conducted. The control vanes are driven by on-board motors in the bird, and power for the motors and for vane control is provided by a battery source contained in the bird.

In one known control system, a signal wire extends through the seismic streamer cable which has one or more birds suspended from the streamer. A coil is disposed in the bird along an axis which is transverse to the nominal longitudinal axis of the signal wire running through the streamer. Signals transmitted along the wire are coupled by way of an air core inductive coupling including the coil in the bird and by which commands are coupled to the bird for control of the vanes. In another known system, two signal wires are provided in the streamer and a coil is connected across the signal wires and oriented along the longitudinal axis of the streamer at intended positions at which birds are disposed. Each bird includes a longitudinally oriented coil in coupling relationship with the coil within the streamer and by which signals transmitted along the streamer wires are coupled to the bird for vane control. The air core coupling relationship in both known systems is relatively inefficient, and in the latter system is subject to rather critical alignment of the transmitting and pick up coils to provide usable signal transfer.

SUMMARY OF THE INVENTION

The present invention provides a system for the efficient coupling of signals from the streamer to birds disposed therealong, and the coupling of data from the birds to the streamer, as well as the coupling of power signals from the streamer to the birds for charging of the batteries therein. In a preferred embodiment, a high permeability ring of magnetic material is disposed around the streamer at any intended position along the length of the streamer or its lead-in. A coil is wound around a segment of the core and is connected to the circuitry within the bird. The coil can be apart of a resonant circuit for even more efficient power and signal coupling to and from the bird. Power signals are transmitted along the streamer and are inductively coupled via the ring core and associated coil to each bird to provide charging of a battery source in each bird for powering the vane motors and, if desired, to energize the bird electronics. Control signals transmitted along the streamer are also coupled via the ring core and coil to the electronics within the bird, and data and/or other signals can be coupled from the bird electronics via the ring core and coil to the streamer for transmission to a receiving site. Typically, heading, depth and vane angle data are provided by sensors in each bird and can be inductively coupled from each bird to the streamer cable for transmission to the towing vessel or other receiving site.

The invention is also useful for instrument pods or other devices which may be disposed along the length of a streamer cable and to which power and data signals are to be coupled.

A feature of the preferred embodiment is that no inductive coupling structure is required within in the streamer. In alternative embodiments, the invention can be employed with inductive coupling structures, a portion of which is within the streamer. However, these alternative embodiments are still of improved performance by reason of the efficient coupling structure and techniques employed in accordance with the invention. Moreover, the present invention may be used with existing two wire system when used in conjunction with the cable terminator, discussed below.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
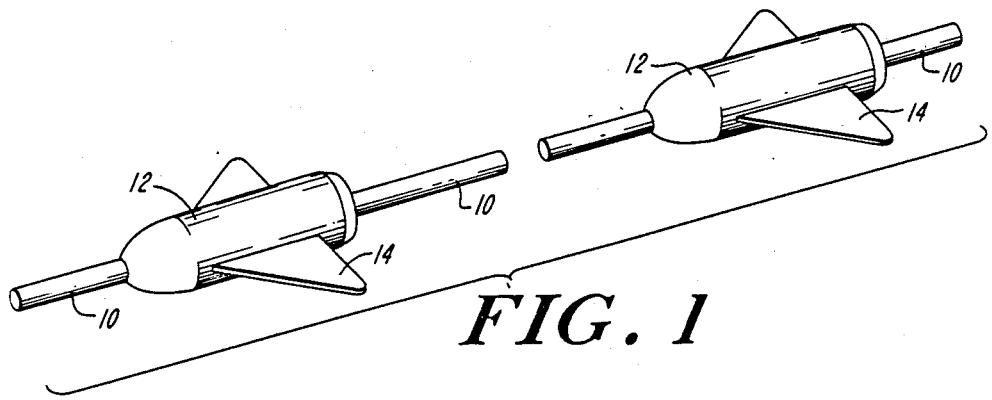
FIG. 1 is a diagrammatic representation of a streamer cable and cable leveling devices (birds) spaced along the length thereof.

Referring to FIG. 1, there is shown a seismic streamer cable having disposed at spaced intervals along the length thereof cable leveling devices or birds 12, each of which includes adjustable vanes 14 by which the position of the bird is controlled and its depth maintained. Alternatively, the birds can be suspended below the streamer cable by collars (not shown) affixed to the cable and from which each bird is suspended. The cable and collars are rotatable in relation to the birds. Each bird 12 includes a heading sensor (not shown) for determining the orientation in azimuth of the bird with respect to magnetic north or other reference position, and/or a depth sensor for determining the depth of the bird below the water surface. The cable 10 is rotatable within the birds as the cable alters its orientation while being towed due to towing forces and water movement. In accordance with the present invention, electrical power is transmitted along the cable 10 and is inductively coupled to each bird 12 to energize the electronic circuitry therein and to provide charging of a battery source in each bird employed for powering the vane motors. Heading, depth, and control vane angle data provided by instrumentation (104 of FIG. 3) in each bird are also inductively coupled from the bird to the cable for transmission back to the towing vessel for receipt and processing of such data. Thus, no direct wire interconnections are needed between the bird and the cable, as all power and data signal transmission between the cable and birds is via inductive coupling.

Figure 2:
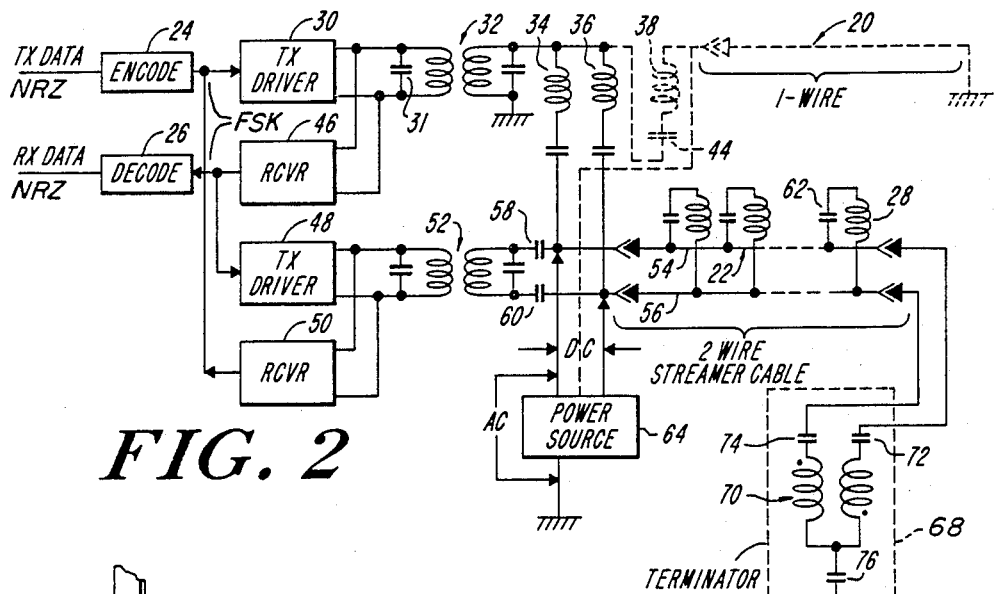
FIG. 2 is a schematic diagram of the cable driving and termination for one and two wire systems according to the present invention.
Figure 3:
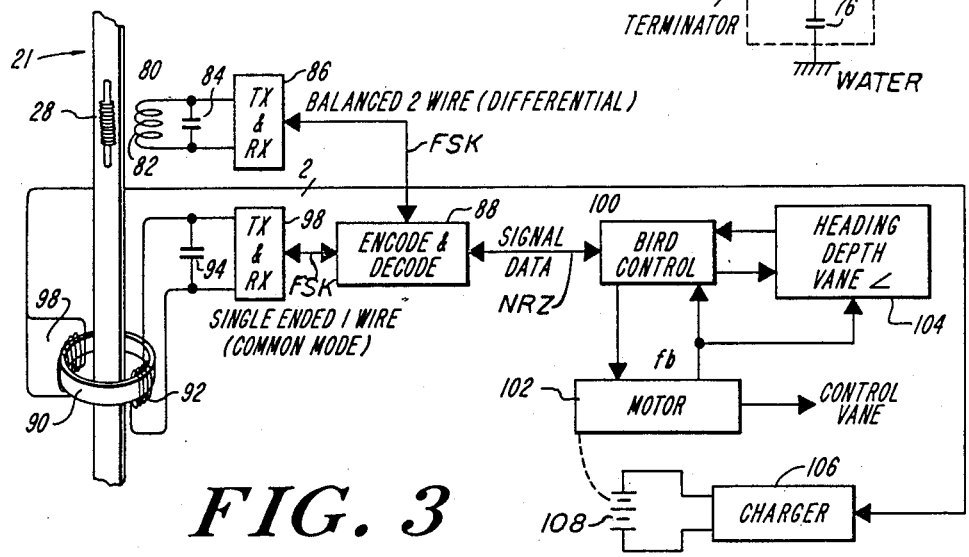
FIG. 3 is a block diagram of a circuit at each bird for sending are receiving signals over the streamer cable.

An electronic system is shown in diagrammatic form in FIG. 2 for providing data signals to and receiving data signals from either one wire or two wire streamer cables 20 and 22 respectively. Transmit and receive data is converted or encoded into suitable signal form, such as frequency shift keying (FSK) signal by encoder 24 and the received signal is decoded from the corresponding signal format by decoder 26. The encoder 24 includes a gated oscillator which in turn is coupled to a pulse FSK modulator, and the format of the signal transmitted along the signal line of the streamer to the birds includes an address for the particular bird to be interrogated, commands for the addressed bird and data checks. The command data can include commands to govern adjustment of the control vanes to maintain the bird at an intended depth, and requests for data from the heading, depth and vane angle sensors of the bird to be reported back to the central unit. The encoder 24 and decoder 26, which preferably includes a microprocessor, is operative to recognize its unique address and, upon such recognition, to provide signals to an oscillator (not shown) which produces an FSK modulated signal for driving of the transformer primaries. Either streamer cables 20 or 22 radiates a signal with FSK modulated energy to the circuit of FIG. 3 Data from the sensors on board the bird transmitted by the circuit of FIG. 3 are received by the streamer cable (20 or 22) and are conveyed by the received 46 to the decoder 26 for conveyance back along the streamer signal line to the central unit. In one embodiment of the present invention, the encoded signal is coupled to the two wire streamer cable 22 in a redundant fashion, providing both common mode (single-ended transfer and balanced (differential) signal over the two wire streamer cable, the latter permitting the use of previously known inductive coupling systems having lump inductors 28 for communication to the corresponding inductor (42) in the individual bird 12. The encoded signal is presented to the streamer cable in single-ended form by driving the primary of a transformer 32 with a driver 30, wherein the secondary of the transformer 32 forms a circuit with the one wire streamer cable 20 or two wire streamer cable 22 and a return path including the sea water, and also including coupling through inductors 38 and 34, 36 and capacitors 44 and 40, 42, respectively. The transformer 32 may include capacitors across each winding to allow operation in a resonant mode thereby enhancing the efficiency and limiting the transmission of spurious signals therethrough. The single-ended signals are received through the same coupling circuits are provided connection to the streamer cable from the transmit driver 30, wherein the receiver 46, connected to the primary of the transformer 32, receives the incoming encoded signal and provides the necessary preamplification and base band detection of the encoded signal. Although a variety of state of transmission techniques may be employed, the present embodiment provides a carrier frequency of approximately 26 KHz having a deviation of ±1500 Hz, whereupon data is transmitted therethrough according to an FSK modulation technique.

Differential or two wire communication is provided by a transmit driver 48 and differential receiver 50, receiving and providing the encoded signals from and to the encoder 24 and decoder 26 as was the transmit driver 30 and receiver 46, discussed above. The transmit driver 48 energizes the primary of a transformer 52, whereupon the secondary provides a differential signal to the wires 54 and 56 of the two wire streamer cable 22. The streamer cable includes the aforementioned lumped inductances 28 to provide data transfer at specific intervals along the streamer cable. The transformer 52 is coupled to the streamer cable 22 by DC blocking capacitors 58 and 60, which enable the data signal to be coupled to the cable 22 from the transformer 52 while providing an open DC path across the two wires of the streamer cable 22. Similarly, each (lumped) inductor 22 is connected to a blocking capacitor 62, which allows a DC potential to exist along the two wire streamer cables, and may be further selected to provide a resonant circuit at desired frequency, typically the center of the communication channel used. Furthermore, the capacitors 40 and 42 previously mentioned with regard to the common mode signal operation also provide a nonconducting path across the two wires 54 and 56 of the two wire streamer cable, thus allowing a DC potential to exist thereacross. The DC power is provided by a power source 64 which may also provide an AC signal will be transferred to the individual bird 12 by inductive coupling discussed below. The received data is similarly provided by a receiver 50 connected to the transformer 52 primary wherein the data received from each bird is received from each bird is received by the (lumped) inductor 28 and provided on the cable 22 through the transformer 52. The output of the receiver 50 is provided to the decoder 26 for decoding of a particular modulation technique, e.g., NRZ, which may be used as desired.

The terminator 68 allows the present invention to be retrofitted to and coexisting with existing two wire streamer cables and therefore allow the streamer cable 22 to be excited in both a single-ended and differential mode. Terminator 68 includes a balun 70 is connected to return the end of one winding and the beginning of the other winding in signal conduction to the water while receiving the differential signal to the other end of each respective winding, thus providing a high impedance termination in differential mode and, by way of transformer action, providing a low impedance for single-ended, common mode signals. A further capacitor 76 may be included to allow for enhanced balancing of the terminator impedance.

The techniques of receiving the signal from the streamer cable 22 at each bird 12 is shown in the block diagram of FIG. 3. Differential mode communication of data between the tow streamer cable 22A lumped inductor 28 and bird 12 is provided through the pickup inductor 82 oriented to be magnetically coupled to the inductor 28 and may be operated in resonant mode by selection of capacitor 84. The coil is connected to receive and transmit circuits 86, which include circuits analogous to the transmit driver 48 and receiver 50 described above. The resulting detected signal is received by the end code and decode function circuits 88 which includes the functions complementary to the end code and decode function of elements 24 and 26, above.

The resulting signals are provided to the bird control electronics which controls the bird motors 102, which adjust the various bird mechanical devices, discussed above. Position feedback signal is provided by the motor 102 to the control electronics 100. Moreover, the control electronics 100 communicate with the heading, depth and vane angle elements, to derive signals which are communicated to the ship via the streamer cable 21. The resulting control signals from the bird are received be the encode and decode electronics 88 and then transmitted to the respective transmit sections of the common mode and differential transmit electronics 86 and 98.

According to the present invention, the balanced two wire differential communication elements discussed above may be used in conjunction with the single-ended common mode elements 90 and 98 or be entirely replaced by the single-ended communication elements 90 and 98 wherein the bird will receive and transmit all necessary communication via the cable 21 in single-ended common mode connection. The common mode signals from the cable 21 are coupled to the transmit and receive electronics 98 by a low loss magnetic structure 90 having a winding 92 of a particular inductance and a capacitor 94 selected for resonance with the winding 92 at the data channel center frequency (27 KHz). In the preferred embodiment, the approximate 50 turns provides the efficient coupling signals from the signals from the streamer cable 21 to the transmit and receive electronics 98. Further details of the structure 90 are provided below with respect to FIGS. 4–8.

In a further embodiment, the present invention includes a battery charger 106 which provides a charging current to battery 108 by energy induces in an additional winding 98 to receive charging energy induces from the streamer cable 21. The signals induced may be at a lower AC frequency, or they may be near or at the same data channel frequency. Moreover, the charger 106 may be powered by signals derived directly from the signal winding 92 and the additional winding 98 may be unnecessary.

The signal format of the signal transmitted along the signal line includes an address for the particular bird to be interrogated, commands for the addressed bird and data checks. The command data typically includes commands to govern adjustment of the control vanes to maintain the bird at an intended depth, and requests for data from the heading, depth and vane angle sensors 104 aboard the bird. Data from the sensors of the bird are coupled to receiver 50 from the encoder-decoder 88 which provides the output data at the central unit.

The bird circuitry is shown in FIG. 3 and includes a tuned antenna 80 composed of a coil 82 and a capacitor 84 or a single-ended common mode antenna having inductor 92 and capacitor 94. The signals produced are received by the received circuits in 86 and 96 which are then received by encoder-decoder 88. The encoder-decoder 88 also provides the signals to bird control electronics 100 which control the bird motors 102. A feedback signal is provided by the control motors 102 to the control electronics 100 as part of a closed-loop control system for bird vanes. The circuit 100 also provides a signal to the heading, depth, and vane angle sensors 104 for interrogation of the sensors. The heading, depth, and vane angle data from the sensors 104 is conveyed via circuit 100 and encoder-decoder 88 to the coupling windings 82 and 92 for transmission along the streamer signal line to the towing vessel or other receiving site.

The encoder-decoder 88 in response to a command received from the central unit provides a signal to the bird control 100 to cause interrogation of the sensors 64, and also to provide control of motor(s) 102 driving the control vanes.

Figure 4:
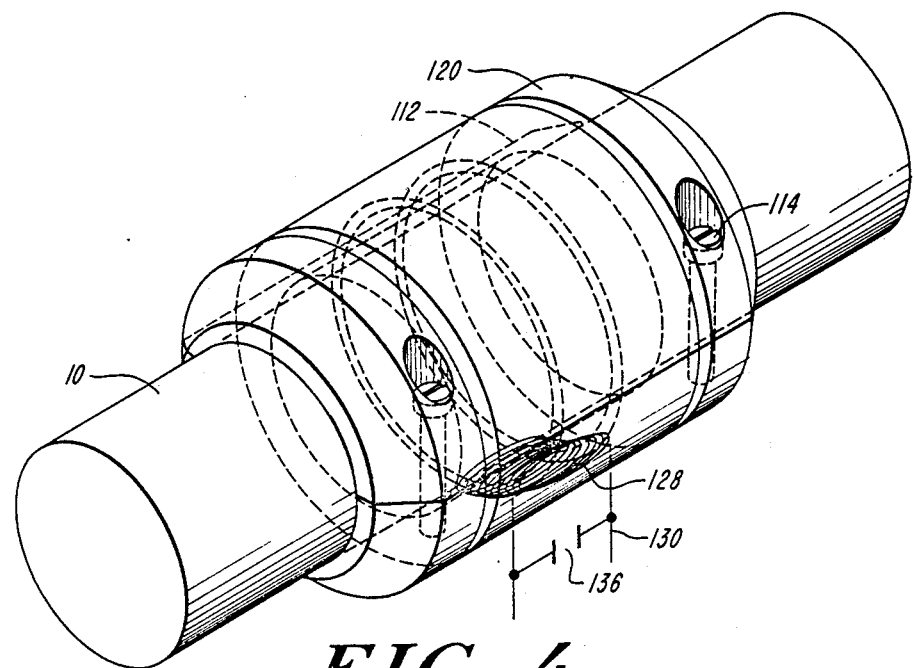
FIG. 4 is a cutaway pictorial view of the inductive coupling structure for power and data communication between the cable and bird.
Figure 5:
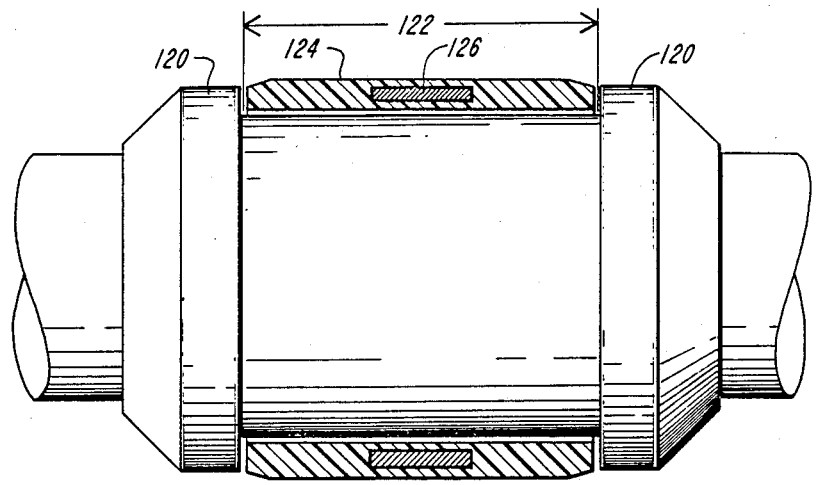
FIG. 5 is a cross-section view of the inductive coupling structure of FIG. 4.

A preferred embodiment of the inductive coupling structure is shown in FIGS. 4 and 5. A collar 100 is affixed around the streamer cable and is clamped to the cable to be rotatable therewith. The collar is preferably formed of a suitable plastic material such as polyurethane, and includes a circumferential channel 102 in which is disposed a ring 104 containing a high permeability magnetic core 106. The ring is also preferably formed of a suitable plastic material such as polyurethane, and is in slidable rotational relationship with the fixed collar. A coil 108 is wound around a portion of the magnetic core 106 and includes a pair of lead wires 110 which can be coupled to the circuitry of the bird. Additional coils (e.g., 98, not shown) may also be included. The magnetic core and the coil wound around a portion thereof are enclosed within the plastic ring 104, typically by molding the ring around the magnetic core and associated coil. The plastic ring and magnetic core are of split ring construction so that the ring structure can be easily installed onto the fixed collar or removed therefrom. Typically, the ring has a hinge 112 at one of the confronting ends and a locking mechanism 114 at the opposite confronting ends. The axis of separation between the halves of the ring structure can be inclined as illustrated so that the coil can be disposed along the bottom portion of the ring to be in proximity for connection to the bird suspended from the fixed collar.

The core 106 can be constructed by various techniques which are themselves known. For example, the core can be tape-wound of a suitable magnetic material, or can be molded or otherwise formed of a ferrite or other sintered material providing the intended magnetic characteristics. The coil can be directly connected to the electronics of the bird or can be connected via an intermediate connector.

The coil can preferably be tuned to a resonant frequency (e.g., 26 KHz) by use of a capacitor 116 which, together with the coil, provides an intended tuned circuit having an intended resonant frequency.

It is noted that for single wire or common mode (single sided) two wire data transfer, no coil is necessary within the streamer cable, and that coupling is accomplished via a high permeability core transformer operating as a current transformer. The coupling structure can be used on the streamer lead-in, as well as along the streamer cable, typically in association with a collar to fit over the lead-in portion of the streamer. Collars can be installed anywhere along the streamer or lead-in as there is no need for alignment with internal coils, as in prior art system.

In an alternative implementation, the inductive structure can be partially in the streamer cable and cooperative with a circuit disposed in each bird.

Figure 6:
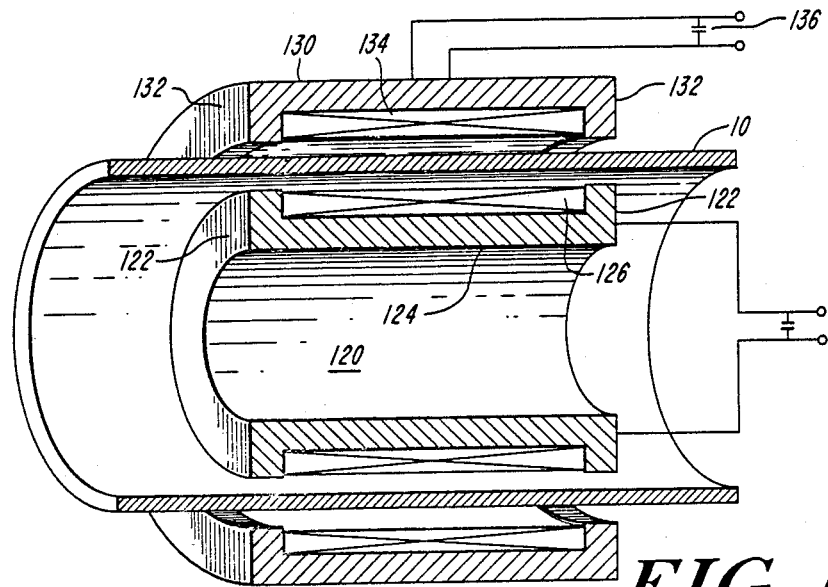
FIG. 6 is a cutaway pictorial view of an alternate inductive structure.

An alternative inductive coupling structure in the streamer is shown in FIG. 6. A cylindrical magnetic core 120 is disposed within the streamer and includes a pair of axially spaced and radially extending flanges 122, and a cylindrical intermediate section 124 about which a coil 126 is wound. A capacitor 128 is connected in shunt across the coil 126. The coil and capacitor are connected to the streamer circuitry of FIG. 2. The outer periphery of the core flanges 122 are in engagement with or closely confront the inner wall of the streamer. The inductive coupling structure of FIG. 6 and the circuit of FIG. 2 (without the differential pickup and receiver) are preferably housed within a cartridge located in the streamer. Such a cartridge is itself the subject matter of U.S. Pat. No. 4,471,534, issued Sept. 18, 1984, of same inventor as herein. The magnetic core 132 is contained within the bird housing. The core is usually in two halves, each half of the core being contained within hinged half-sections of the bird enclosure for assembly around the streamer cable.

The antenna or inductive structure within the streamer and associated inductive structure in the bird are tuned to the same resonant frequency of the data channel to provide efficient electrical energy transfer between these structures even in the presence of misalignment between the respective cores or varying spacing therebetween. Thus, the variation in the gap between the confronting cores is not critical.

Figure 7:
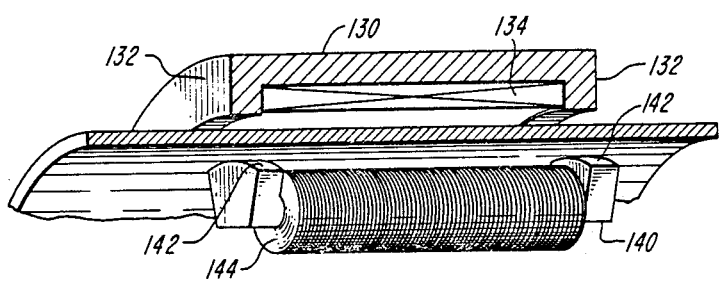
FIG. 7 is a cutaway pictorial view of a second alternative inductive structure.

An alternative inductive structure is shown in FIG. 7. The outer magnetic core 130 is the same as the magnetic core 130 of FIG. 6. The inner core 140 contained within the streamer 10 is a U-shaped core having pole faces 142 which confront the pole faces of core 130. A coil 144 is wound around central section of the U-shaped core. The pole faces 442 can be rounded to conform to the circumference of the streamer.

Figure 8:
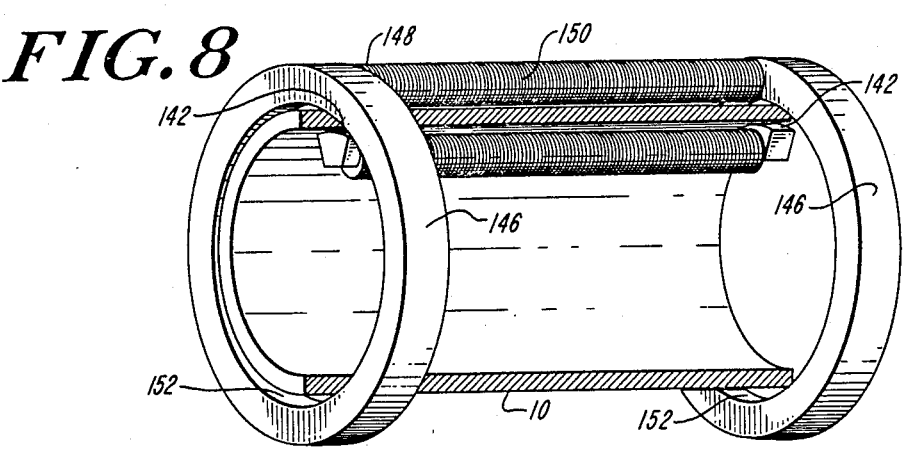
FIG. 8 is a cutaway pictorial view of a third alternate structure.

A further embodiment is shown in FIG. 8 in which the magnetic structure disposed in the bird is composed of a magnetic core having first and second rings 86 and an interconnecting bar 148 about which a coil 150 is wound. The U-shaped core 140 shown in FIG. 9 is employed in the streamer, with the pole faces 142 in confronting relationship with the surfaces 152 of the respective core rings. The rings can be split for assembly about streamer cable. The streamer of FIG. 8 has less bulk and less weight than the core 130 in the FIG. 6 embodiment.

The invention is not to be limited by what has been particularly shown and described except as indicated in the appended claims.

What is claimed is:

1. For use in a seismic streamer system which includes a streamer cable along which one or more birds are disposed and having a signal line upon which signals are conveyed to the birds from a central unit and from the birds to the central unit, a communication system comprising:
    a streamer circuit disposed in the streamer cable at the position of each bird and including:
    a first inductive coupling structure tuned to a predetermined resonant frequency and having pole faces confronting the wall of the streamer cable;
    circuit means connected to the first inductive coupling structure and operative to energize the structure in response to signals received from the signal line of the streamer cable and to provide signals to the signal line in response to signals received from the first inductive coupling structure; and
    a bird circuit disposed in each bird and including:
    a second inductive coupling structure tuned to the same resonant frequency as the first inductive coupling structure and having pole faces confronting the pole faces of the first inductive coupling structure; and
    circuit means connected to the second inductive coupling structure and operative in response to signals received by the second inductive coupling structure to provide power and data signals and to provide data signals to the second inductive coupling structure in response to sensor data provided by sensors in the bird,
    the first and second inductive coupling structures being in resonant coupling relationship for efficient transfer of power and data signals.

2. The system of claim 1 including:
    a battery charger in the bird operative in response to said Power signals to charge a battery in the bird employed for energizing one or more control vane motors of the bird.

3. The system of claim 2 including:
    heading, depth, and vane angle sensors in the bird interrogated by data signals from the circuit means of the bird circuit and providing heading, depth, and vane angle data to the circuit means of the bird circuit.

4. The system of claim 1 wherein
    the first inductive coupling structure includes spaced pole faces and an intermediate core and having a coil disposed therewith, and a capacitor operative with the coil to provide the resonant frequency, and wherein
    the second inductive coupling structure includes spaced pole faces and an intermediate core and having a coil disposed therewith, and a capacitor operative with the coil to provide the resonant frequency.

5. The system of claim 4 wherein said streamer circuit includes:
    an encoder to convey data from a central unit;
    a decoder to convey data to the central unit;
    a gated oscillator coupled to the encoder and operative to provide modulated pulses according to the data;
    a first tuned antenna including an antenna coil and a capacitor tuned to an intended frequency receiving said modulated pulses and operative for radiation to a second tuned antenna which is part of a bird circuit, and reception from the second tuned antenna; and
    a receiver coupled to said first tuned antenna and operative in response to signals received by the first tuned antenna from the second tuned antenna to provide signals to the decoder for conveyance on the signal line to the central unit.

6. The system of claim 4 wherein said bird circuit includes:
    a second tuned antenna including an antenna coil and a capacitor tuned to the same frequency as the frequency of the first tuned antenna and operative for transmission to the first tuned antenna and for reception therefrom;
    an encoder-decoder coupled to the second tuned antenna and operative to provide data signals;
    a control circuit operative in response to signals from the encoder-decoder to provide control signals for one or more bird motors disposed in the bird; and
    the control circuit also operative in response to signals from the encoder-decoder to interrogate heading, depth, and vane angle sensors in the bird and to convey data from the sensors to the encoder-decoder for transmission via the tuned antennas to the streamer circuit and thence to the signal line of the streamer cable for transmission to the central unit.

7. The system of claim 4 wherein said streamer circuit includes:

a control circuit operative in response to signals from the encoder-decoder to provide control signals for one or more bird motors disposed in the bird, and wherein the control circuit also operative in response to signals from the encoder-decoder to interrogate heading, depth, and vane angle sensors in the bird and to convey data from the sensors to the encoder-decoder for transmission via the tuned antennas to the streamer circuit and thence to the signal line of the streamer cable for transmission to the central unit.

8. The system of claim 1 wherein the inductive coupling structure comprises:

an outer magnetic core having a pair of axially spaced and radially extending flanges and a cylindrical intermediate section between the flanges about which a coil is wound, the inner surface of the flanges providing said pole faces; and wherein the first inductive coupling structure comprises:

an inner core disposed within the streamer and having a U-shaped core with axially spaced pole faces which confront the respective pole faces of the outer core and an intermediate section between the axially spaced pole faces about which a coil is wound.

9. The system of claim 1 wherein the first inductive coupling structure comprises:

an inner magnetic core disposed within the streamer and having first and second rings each having an outer circumferential surface confronting the inner surface of the streamer, and an interconnecting section about which a coil is wound, and wherein the second inductive coupling structure comprises:

an outer magnetic core disposed around the streamer and having a pair of axially spaced and radially extending flanges, each having an inner circumferential face confronting the outside surface of the streamer and in general alignment with peripheral surface of the inner core, and a cylindrical intermediate section about which a coil is wound.

10. The system of claim 1 wherein the first inductive coupling structure comprises:

a first cylindrical magnetic core disposed within the streamer cable and including a pair of axially spaced and radially extending flanges, and a cylindrical intermediate section between the flanges and about which a first coil is wound, the inner surface of the flanges providing said pole faces; and a capacitor connected across the coil and cooperative to provide the resonant frequency, and wherein the second inductive coupling structure comprises:

a second magnetic core disposed around the streamer and having pole face flanges in general alignment with the flanges of the first cylindrical magnetic core, and an intermediate section between the flanges of the second core and about which a second coil is wound; and a second capacitor connected across the second coil and cooperative to provide the resonant frequency.

11. For use in a seismic streamer system which includes a streamer cable along which one or more birds are disposed, a communication system comprising:

a streamer circuit in the streamer cable at the position of each bird and including:

first means operative in response to signals received from the streamer cable to provide modulated pulses;

a tuned antenna driven by the modulated pulses and operative to radiate energy;

a receiver coupled to the tuned antenna and operative in response to energy received by the tuned antenna to provide signals in response thereto;

second means operative in response to the signals from the receiver to provide signals to the streamer cable for transmission therealong; and a bird circuit disposed in the bird and including:

a tuned antenna in coupling relationship with the tuned antenna of the streamer circuit;

third means coupled to the tuned antenna of the bird circuit and operative to provide power and data signals;

a battery charger operative in response to the power signals to charge a battery disposed in the bird and employed for energizing one or more control vane motors of the bird; and means operative in response to the data signals to provide control signals for the control vane motors and operative to interrogate one or more transducers disposed in the bird and to convey signals therefrom to the tuned antenna of the bird circuit.

12. For use in a seismic streamer system having a streamer cable along which one or more birds are disposed and upon which signals are conveyed to the birds from a control unit and from the birds to the central unit, a communication system comprising for each bird position:

a first inductive coupling structure tuned to a predetermined resonant frequency and disposed within the streamer cable at the position of the bird;

circuit means in the streamer cable connected to the first inductive coupling structure and operative to drive the first inductive coupling structure with signals derived from signals conveyed on the streamer cable and to provide signals to the streamer cable in response to signals received from the first inductive coupling structure;

a second inductive coupling structure in the bird and tuned to said predetermined resonant frequency and in resonant coupling relationship with the first inductive coupling structure; and circuit means in the bird connected to the second inductive coupling structure and operative in response to signals received by the second inductive coupling structure from the first inductive coupling structure to provide power and data signals to apparatus in the bird, and to provide data signals from the bird to the second inductive coupling structure.

13. The system of claim 12 wherein each of the inductive coupling structures includes:

a magnetic core having pole faces in inductive coupling relationship with the pole faces of the other structure;

a coil wound on the magnetic core; and a capacitor in circuit with the coil and cooperative to provide the predetermined resonant frequency.

14. The system of claim 13 wherein the pole faces of the first inductive coupling structure confront the inner wall of the streamer cable, and wherein the pole faces of the second inductive coupling structure confront the outer wall of the streamer cable in general alignment with the pole faces of the first inductive coupling structure.

15. The system of claim 13 wherein the first inductive coupling structure includes:
a first cylindrical magnetic core disposed with the streamer cable and having a pair of axially spaced and radially extending flanges, and a cylindrical intermediate section between the flanges about which the core is wound, the inner surfaces of the flanges providing the pole faces, and wherein the second inductive coupling structure includes:
a second cylindrical magnetic core disposed around the streamer and having axially spaced and radially extending flanges which confront the respective flanges of the first magnetic core, and a cylindrical intermediate section between the flanges and about which a second coil is wound.

16. The system of claim 13 wherein the first inductive coupling structure comprises:
an inner magnetic core disposed within the streamer and having first and second rings each having an outer circumferential surface confronting the inner surface of the streamer, and an interconnecting section about which a coil is wound, and wherein the second inductive coupling structure comprises
an outer magnetic core disposed around the streamer and having a pair of axially spaced and radially extending flanges, each having an inner circumferential face confronting the outside surface of the streamer and in general alignment with peripheral surface of the inner core, and a cylindrical intermediate section about which a coil is wound.

17. The system of claim 13 wherein the inductive coupling structure comprises:
an outer magnetic core having a pair of axially spaced and radially extending flanges and a cylindrically intermediate section between the flanges about which a coil is wound, the inner surface of the flanges providing said pole faces, and wherein the first inductive coupling structure comprises:
an inner core disposed within the streamer and having a U-shaped core with axially spaced pole faces which confront the respective pole faces of the outer core and an intermediate section between the axially spaced pole faces about which a coil is wound.

18. The system of claim 13 wherein each of the pole faces is rounded to conform with the cylindrical surfaces of the streamer cable.

19. The system of claim 12 wherein each of the inductive coupling structures includes a capacitor cooperative with the coil to provide the predetermined resonant frequency.

20. The system of claim 12 further including a battery charger in the bird and operative in response to power signals derived from signals on the streamer cable and coupled from the first inductive coupling structure to the second inductive coupling structure to charge a battery in the bird and employed for energizing one or more control vane motors of the bird.

21. A system for conveying signals from a seismic streamer cable to one or more birds disposed along the length of the cable, the system comprising:

first means disposed in the streamer cable at the position of each bird and including a first resonant inductive coupling structure;
second means disposed in each bird and including a second resonant inductive coupling structure cooperative with the respective first resonant inductive coupling structure in the streamer cable;
the first means being operative in response to signals derived from the streamer cable to energize the first resonant inductive coupling structure for coupling of signals to the second resonant inductive coupling structure; and
the second means operative in response to signals received by the second resonant inductive coupling structure from the first resonant inductive coupling structure to provide signals to the bird and to provide power to the bird.

22. The system of claim 21 wherein the second means is operative to provide data signals from the bird to the second resonant inductive coupling structure for coupling to the first resonant inductive coupling structure, and
the first means being operative in response to data signals received by the first resonant inductive coupling structure from the second resonant inductive coupling structure to provide data signals to the streamer cable.

23. The system of claim 22 wherein the bird includes:
a battery charger for charging a battery in the bird and employed for energizing one or more control vane motors of the bird, and
the second means being operative in response to signals received by the second resonant inductive coupling structure to provide power to the battery charger.

24. For use with a seismic streamer system which includes a streamer cable along which one or more birds are disposed, a communication system comprising:
a signal line disposed within said streamer cable;
means to provide a conductive path from the distal end of said signal line to the surrounding body of water;
central unit transmit means providing a flow of current through said signal line according to signals provided at said central unit;
a magnetic structure including a magnetic material to surround said signal line and signal winding thereon to provide a signal in response to the flow of current on said signal line; and
bird data decoder means for providing data signal according to the current induced in said magnetic structure.

25. The communication system according to claim 24, further including:
bird transmit means providing an induced magnetic field in said signal line according to signals provided at said bird; and
central unit receiver means providing a signal in response to the signals induced in the signal line by said bird.

26. For use with a seismic streamer system which includes a streamer cable along which one or more birds are disposed, a communication system comprising:
a signal line disPosed within said streamer cable;
means to provide a conductive path from the distal end of said signal line to the surrounding body of water;

a magnetic structure including a magnetic material in close proximity to said signal line and signal winding thereon to provide a signal in said signal line in response to the flow of current on said signal winding;

bird transmit means providing said flow of current in said signal winding according to signals provided at said bird; and central unit receiver means providing a signal in response to the signals induced in the signal line by said bird.

27. The communication system according to claim 1, further including:

central unit transmit means providing a flow of current through said signal line according to signals provided at said central unit; and bird data decoder means for providing data signal according to the current induced in said magnetic structure from said flow of current through said signal line.

28. A system for conveying data between a plurality of remote birds and a ship, comprising:

a controller mounted on said ship including a data transmitter and a data receiver each providing data transfer at a selected frequency range;

a power source providing an alternating current;

a cable having a plurality of conductors;

means for differentially connecting said controller data transmittal receiver to a plurality of said cable conductors;

means for applying said power source alternating current to said cable in a common mode providing a voltage differential across the length of said cable according to said power source;

a plurality of inductors each connected in a circuit to be resonant at said selected frequency range and disposed along said cable in number and relative position corresponding to said plurity of remote birds and being connected across a plurality of cable conductors to provide an electromagnetic radiation corresponding to said differentially transmitted and received data;

a bird mounted inductor positioned relative to said cable including means for receiving said electromagnetic radiation connected to be resonant at said selected frequency range and means for receiving said common mode power source signal;

a bird mounted transmitter and receiver each connected to said means for receiving said electromagnetic radiation;

bird motion control means responsive to said bird mounted receiver and providing bird position related signals to said bird mounted transmitter; and a bird mounted battery connected to said means for receiving said common mode power source signal and adapted to be recharged therewith.

* * * * *